(No Model.)
T. G. MANDT.
RUNNING GEAR FOR VEHICLES.
No. 486,677. Patented Nov. 22, 1892.
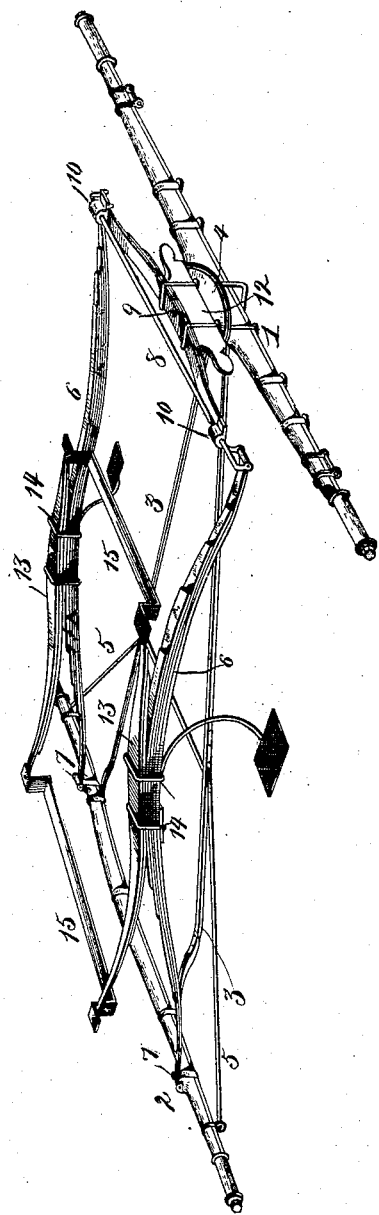
WITNESSES:
F. L. Ourand
W. L. Coombs
INVENTOR:
Targe G. Mandt,
by Louis Bagger & Co.
Attorneys.

UNITED STATES PATENT OFFICE.

TARGE G. MANDT, OF STOUGHTON, WISCONSIN.

RUNNING-GEAR FOR VEHICLES.

SPECIFICATION forming part of Letters Patent No. 486,677, dated November 22, 1892.

Application filed March 5, 1892. Serial No. 423,907. (No model.)

*To all whom it may concern:*

Be it known that I, TARGE G. MANDT, a citizen of the United States, and a resident of Stoughton, in the county of Dane and State of Wisconsin, have invented certain new and useful Improvements in Running-Gears for Vehicles; and I do hereby declare that the following is a full, clear, and exact description of the invention, which will enable others skilled in the art to which it appertains to make and use the same, reference being had to the accompanying drawing, which forms a part of this specification.

My invention relates to improvements in running-gear for buggies and other similar vehicles, the object being to provide an improved construction of the same whereby I secure superior advantages with respect to simplicity and efficiency.

The invention consists in the novel construction and combination of parts hereinafter fully described and claimed.

In the accompanying drawing the figure represents a perspective view of a vehicle running-gear constructed in accordance with my invention.

In the said drawing, the reference-numerals 1 and 2 designate the front and rear axles, respectively, the same being connected together by the diagonal reach-bars 3, secured to the rear axle near its ends. The front or converging ends of these bars are secured to the fifth-wheel 4, connected to the front axle at the center thereof. Secured to the rear axle are diagonal brace-bars 5, connected with the reach-bars near the center thereof.

The numeral 6 denotes the side springs, clipped to the rear axle at 7 and having their front ends clipped to a transverse bar or equalizer 8, connected with the front spring 9 by bearings or collars 10. This front spring is connected with the bolster 12 and fifth-wheel in any ordinary or suitable manner.

The numeral 13 designates the reverse springs connected at or near their centers to the side springs by means of clips 14. Transverse bars 15 connect the reverse springs together at their ends.

From the above it will be seen that I provide a spring-frame upon which the vehicle-body is mounted, the resiliency of the front side and reverse springs providing for the requisite play of said body by which the ease and comfort of the occupant are promoted.

Having thus described my invention, what I claim is—

In a running-gear for vehicles, the combination, with the front and rear axles, of the side springs having their rear ends clipped to the rear axle and their front ends connected with a transverse equalizer, the front spring connected with the front axle and having its ends provided with bearings in which the equalizer rests and the reverse springs secured to the side springs, substantially as described.

In testimony that I claim the foregoing as my own I have hereunto affixed my signature in presence of two witnesses.

TARGE G. MANDT.

Witnesses:
JOHN A. JOHNSON,
W. R. BAGLEY.